Patented Dec. 17, 1929

1,740,141

UNITED STATES PATENT OFFICE

WILLIAM C. ARSEM, OF SCHENECTADY, NEW YORK, ASSIGNOR TO COMMERCIAL SOLVENTS CORPORATION, OF TERRE HAUTE, INDIANA, A CORPORATION OF MARYLAND

PRODUCTION OF FORMALDEHYDE

No Drawing.    Application filed February 3, 1926.   Serial No. 85,779.

My invention relates to the production of formaldehyde from carbon monoxide and water by a catalytic process conducted at elevated temperatures and pressures.

Various proposals of this general character have been made in the past. For instance, Losanitsch and Jovitschitsch (Berichte Chem. Ges. vol. 30, p. 136) claimed that carbon monoxide and water vapor would unite under the influence of the silent electric discharge, producing some formaldehyde. Hoffman and Schibsted (Berichte 51, p. 1414) found that methyl alcohol and formaldehyde were produced when the vapors of formic acid were passed over certain catalysts at elevated temperatures.

Lush (English Patent 180,016—1922), on the other hand, claimed to have produced formaldehyde by passing a mixture of carbon monoxide and hydrogen over a metal and metal oxide catalyst at elevated temperature.

Bredig (German Patent 339,946—1914) asserted that when carbon dioxide and hydrogen were catalytically combined, formic acid was produced, whereas Heinemann (U. S. Patent 1,460,244) asserted that carbon dioxide and hydrogen, together with water vapor, produced formaldehyde under catalytic action at elevated temperature.

My present invention relates to the catalytic combination of carbon monoxide with water, under the influence of catalysts comprising oxides of metals forming weak bases, at elevated temperature and pressure.

Apparently the course of reaction in the process consists of a combinaton of carbon monoxide with water to produce formic acid, which immediately breaks down to produce formaldehyde, carbon dioxide, and water. The major reactions which appear to occur in the process are as follows:—

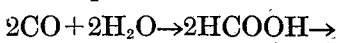
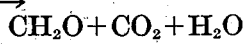

That this is the course of the reaction appears highly probable, but the true course of reaction has not been definitely proven and forms no part of my invention.

Oxides of various metals forming weak bases are suitable catalysts for the reaction, for example the oxides of zinc, tin, aluminum, zirconium, uranium, molybdenum, vanadium, thorium and chromium. These catalysts may be prepared by any convenient method. For example a solution of the nitrate or formate of the metal may be used to impregnate an inert catalyst carrier such as asbestos. Upon ignition the nitrate is converted to the oxide and the catalyst is then available in suitable form.

As an example of the method of preparing a suitable catalyst, the preparation of zinc oxide will be described. 5 grams of zinc carbonate is stirred into 10 grams of water and nitric acid is added until all of the carbonate is dissolved. 20 grams of serpentine asbestos is stirred into this liquid. The resultant pasty mass is dried at 100° C. and ignited at about 550° C.

When mixtures of carbon monoxide and water vapor are passed over a suitable catalyst at elevated temperature and pressure, the reaction occurs and there is formed formaldehyde, some formic acid, water, and carbon dioxide. Since the reaction is not completed by one passage of the gas over the catalyst there is also some unchanged carbon monoxide present in the reacted mixture. The water, formaldehyde and formic acid are removed by cooling the reacted gas mixture whereupon the liquefaction of these constituents takes place.

The residual mixture of carbon dioxide and carbon monoxide may be put back into the process, all of the carbon dioxide being first converted to the monoxide by well-known means—for example by passing the mixture through red-hot coke or charcoal.

The optimum temperature range to be employed varies with the catalyst as is indicated in the following tabulation:—

| Catalyst | Optimum temperature range |
|---|---|
| Zinc oxide | 175–350° C. |
| Tin oxide | 150–300° C. |
| Aluminum oxide | 150–250° C. |
| Zirconium oxide | 200–350° C. |
| Uranium oxide | 150–250° C. |
| Molybdenum oxide | 100–350° C. |
| Vanadium oxide | 150–300° C. |
| Thorium oxide | 200–250° C. |
| Chromium oxide | 100–350° C. |

The process may be operated at pressures varying from 10 atmospheres to 500 atmospheres, but I prefer to employ relatively low pressures, that is between 10 atmospheres and 100 atmospheres.

While the true reaction calls for the interaction of carbon monoxide and water vapor, molecule for molecule, I find that it is advantageous in operation to employ a mixture of carbon monoxide and water vapor in which the carbon monoxide is in molecular excess.

The yields of formaldehyde obtainable from my process vary with the temperature, pressure, and exact gaseous mixture. For example when a mixture of 3 molecular parts of carbon monoxide and two molecular parts of water vapor, is passed over a zinc oxide catalyst at 350° at a space velocity of 1000–15000 under a pressure of about 50 atmospheres there is produced from 5–15% formaldehyde, together with small amounts of formic acid.

Now, having fully described my invention, I claim:—

1. A process for the production of formaldehyde and formic acid which consists in passing a mixture of carbon monoxide and water vapor over a catalyst comprising the oxide of a metal forming a weak base, at a temperature between 150 and 350° C. and at a pressure of 10–500 atmospheres, a suitable combination of temperature, pressure and gas mixture being selected so that the water vapor is not appreciably condensed to the liquid form.

2. A process for the production of formaldehyde and formic acid which consists in passing a mixture of carbon monoxide and water vapor over a catalyst comprising the oxide of a metal forming a weak base, at a temperature between 150 and 350° C. and at a pressure of 10–100 atmospheres, a suitable combination of temperature, pressure and gas mixture being selected so that the water vapor is not appreciably condensed to the liquid form.

3. A process for the production of formaldehyde and formic acid which consists in passing a mixture of carbon monoxide and water vapor over a zinc oxide catalyst, at a temperature between 150 and 350° C. and at a pressure of 10–500 atmospheres, a suitable combination of temperature, pressure and gas mixture being selected so that the water vapor is not appreciably condensed to the liquid form.

4. A process for the production of formaldehyde and formic acid which consists in passing a mixture of carbon monoxide and water vapor over a zinc oxide catalyst, at a temperature between 150 and 350° C. and at a pressure of 10–100 atmospheres, a suitable combination of temperature, pressure and gas mixture being selected so that the water vapor is not appreciably condensed to the liquid form.

In testimony whereof I affix my signature.

WILLIAM C. ARSEM.